United States Patent [19]

Eccleston

[11] Patent Number: 5,289,103
[45] Date of Patent: Feb. 22, 1994

[54] BATTERY CHARGER FOR TOWED VEHICLE

[75] Inventor: Larry Eccleston, Marshall, Mich.

[73] Assignee: Tekonsha Engineering Company, Tekonsha, Mich.

[21] Appl. No.: 806,659

[22] Filed: Dec. 13, 1991

[51] Int. Cl.⁵ .............................................. H02J 7/04
[52] U.S. Cl. ........................................ 320/32; 320/35; 320/39
[58] Field of Search ............... 320/9, 10, 11, 15, 19, 320/20, 21, 22, 23, 24, 31, 32, 39, 40, 49, 50, 61, 64; 322/25, 28

[56] References Cited

U.S. PATENT DOCUMENTS

| | | |
|---|---|---|
| 3,597,654 | 8/1971 | Harland, Jr. et al. . |
| 3,612,982 | 10/1971 | Jones et al. . |
| 3,775,659 | 11/1973 | Carlsen, II .................... 320/21 |
| 4,010,410 | 3/1977 | Kilbourn ........................ 320/31 |
| 4,127,782 | 11/1978 | Omura et al. .................. 320/50 X |
| 4,207,512 | 6/1980 | Taylor ............................ 320/40 X |
| 4,422,032 | 12/1983 | Kakumoto et al. ............. 320/39 |
| 4,468,605 | 8/1984 | Fitzgerald et al. ............. 320/36 |
| 4,472,672 | 9/1984 | Pacholok ........................ 320/21 |
| 4,647,833 | 3/1987 | Munnig Schmidt et al. .... 320/21 |
| 4,727,306 | 2/1988 | Misak et al. ................... 320/35 |
| 4,843,300 | 6/1989 | Alderman ...................... 323/224 |
| 5,045,768 | 9/1991 | Pelly .............................. 320/31 X |

OTHER PUBLICATIONS

Linear/Switchmode Voltage Regulator Handbook, Fourth Edition, 1989.

Primary Examiner—Kristine L. Peckman
Attorney, Agent, or Firm—Price, Heneveld, Cooper, DeWitt & Litton

[57] ABSTRACT

A battery charger is disclosed for charging a battery from a vehicle electrical system. The battery charger includes switching devices and a storage element for providing a supply from the vehicle electrical system. The regulator is connected to the switching devices and the storage element for regulating a voltage applied to the battery. The regulated voltage is controlled to have a first value during charging and a second value after the battery is charged.

12 Claims, 1 Drawing Sheet

BATTERY CHARGER FOR TOWED VEHICLE

BACKGROUND OF THE INVENTION

This invention relates to battery chargers and more particularly, it relates to circuits for supplying a charging potential from a power source to a battery. Still more particularly, the invention relates to a circuit for supplying a charging potential from a vehicle electrical system to a separately carried battery, such as a sealed lead-acid battery in a towed vehicle, i.e., trailer, or the battery power pack of a portable cellular phone, etc.

It is highly desirable, and indeed a requirement, that certain towed vehicles, i.e., trailers of a certain size rating, have a system for actuating the towed vehicle brakes should the towed vehicle break away from a towing vehicle. These towed vehicles typically include electric brake-actuation components powered from the towing vehicle electrical system during normal towing conditions. However, power for energizing the electric brake-actuation components is not available from the towing vehicle when the towed vehicle separates from the towing vehicle.

To provide a power source on the towed vehicle for energizing the brakes if a breakaway occurs, a battery is provided on that vehicle. In order for the battery to apply sufficient power to the towed vehicle brakes to stop the towed vehicle and hold it for a prescribed time, the battery must be fully charged while the vehicle is being towed. For example, a fully charged battery will hold the towed vehicle brakes engaged for at least fifteen minutes for purposes of stopping the towed vehicle and preventing rolling once the towed vehicle stops. However, prior to being towed, the vehicle may remain inactive for an extended time period, during which the battery charge may be significantly or completely depleted. Furthermore, as noted hereinafter, the steady-state or "float" level of a lead-acid battery is well below its fully charged level in any event.

Accordingly, it is desirable to charge the towed vehicle battery from the towing vehicle electrical system while the vehicle is being towed. Prior art systems connect the battery of the towed vehicle to the electrical system of the towing vehicle through a diode, or a series connection of a diode and a resistor. Thus, a voltage drop, at least equal to the forward voltage drop of the diode, exists between the tow vehicle electrical system and the towed vehicle battery. This voltage drop slows the rate at which the battery charges and in most cases prevents the towed vehicle battery from being fully charged. A depleted battery charged from a low supply voltage may take hours, or even days, to charge to the level of the applied voltage. During that time, should the trailer disconnect from the towing vehicle, the battery will not have sufficient capacity to adequately actuate the towed vehicle brakes.

Known circuits for charging a battery from a vehicle electrical system have a number of other disadvantages and limitations. In particular, they apply a voltage to the battery which is directly proportional to the supply voltage of the vehicle electrical system and, accordingly, they are unable to effectively control the voltage applied to the battery. For example, the optimum charging voltage for the battery is dependent upon the ambient temperature. However, prior art circuits for charging a battery from a vehicle are unable to compensate for ambient temperature variations. Thus, prior art circuits are unable to charge the battery to a higher voltage at low ambient temperatures than at a higher ambient temperatures. Additionally, such prior art circuits are unable to supply a relatively high charging potential until the battery is fully charged and a lower "floating potential" once the battery reaches the charging voltage. On the one hand, if the optimum charging voltage is applied to the battery after it is fully charged, the electrolyte will boil away. On the other hand, if a smaller voltage is used to charge the battery, a significant time period is required to fully charge the battery.

Chargers are known for charging a battery from a stable power supply such as an AC wall outlet. These chargers use either a step-up converter or a step-down converter, depending upon the relationship between the supply source potential and the battery charging potential. The supply voltage must be greater than the charging voltage for a step-down converter and less than the charging voltage for a step-up converter for the charger to supply an appropriate voltage to the battery. However, the supply voltage from a vehicle, e.g., a car or truck, will vary substantially, depending upon whether the car engine is running or off, the length of time that the engine has been off, etc. The voltage on the battery being charged will also vary widely depending upon how long the battery being charged has been idle. Accordingly, the voltage output by a vehicle electrical system may be larger or smaller than the voltage on the battery being charged at any given time. Thus, step-up and step-down voltage converters are unable to reliably provide an adequate battery charging voltage from a vehicle power supply.

BRIEF DESCRIPTION AND FEATURES OF THE PRESENT INVENTION

The present invention effectively resolves the problems described above which characterize known devices for charging a battery from a vehicle electrical system. In accordance with the invention, a new and more effective battery charger is provided through the combined effect of a number of distinct features which vary in both concept and implementation from those found in the prior art, and which combine synergistically to provide a battery charger which is both more effective and more efficient than those utilized heretofore.

In one aspect of the invention, the charger includes a regulator for controlling the voltage applied to the battery, such that it has a first level when the battery is charging and a second level when the desired final charge state is reached. The charger includes an input device adapted to be coupled to a vehicle electrical system and which supplies a voltage to the regulator.

In another aspect of the invention, the battery charger includes an energy storage element and a switch. The switch is adapted to selectively couple said storage element to a vehicle electrical system. A controller includes at least one output coupled to said switch, a first input adapted to be coupled to said towing vehicle electrical system, and a second input coupled to said storage element. The controller generates a control signal applied to the output for controlling the switch responsive to a reference signal received at the second input and the magnitude of the signal received at the first input.

In yet another aspect of the invention, switch means are coupled to terminals of the energy storage device for selectively connecting the storage device to a vehicle electrical system and to the battery. The regulator is coupled to the storage device via the switch means such that the voltage output by the switch means is regulated to a predetermined level regardless of whether the vehicle electrical system voltage is greater or less than the regulated output voltage.

In another aspect of the invention, the regulator includes a device which generates a signal having a level dependent upon the ambient temperature. The regulator is responsive to the temperature-dependent signal for controlling the output signal applied to the battery as a function of the ambient temperature.

Some of the more salient attributes of the present invention include a charger for charging a battery from a vehicle electrical system which outputs a signal at a controlled voltage level regardless of whether the supply voltage is greater or less than the controlled voltage level; a battery charger including a regulator which controls the voltage applied to the battery such that it provides a charging voltage and a floating voltage at different levels; a regulator which applies a potential to the battery which is dependent upon the ambient temperature such that the battery is charged to and floats at an optimum voltage at different temperatures; and a new form of current control driver circuit which controls the energy applied to the battery to an optimum level such that the effective energy level applied to the battery is larger, to provide faster charging when the energy from the vehicle electrical system is greater.

These and other features and attributes of the invention will become more apparent after contemplation of the ensuing more detailed description, particularly when considered with and in light of the accompanying drawing.

BRIEF DESCRIPTION OF THE DRAWING the drawing figure is a schematic circuit diagram showing a battery charger in accordance with the invention.

DESCRIPTION OF THE PREFERRED EMBODIMENT

Figure 1:
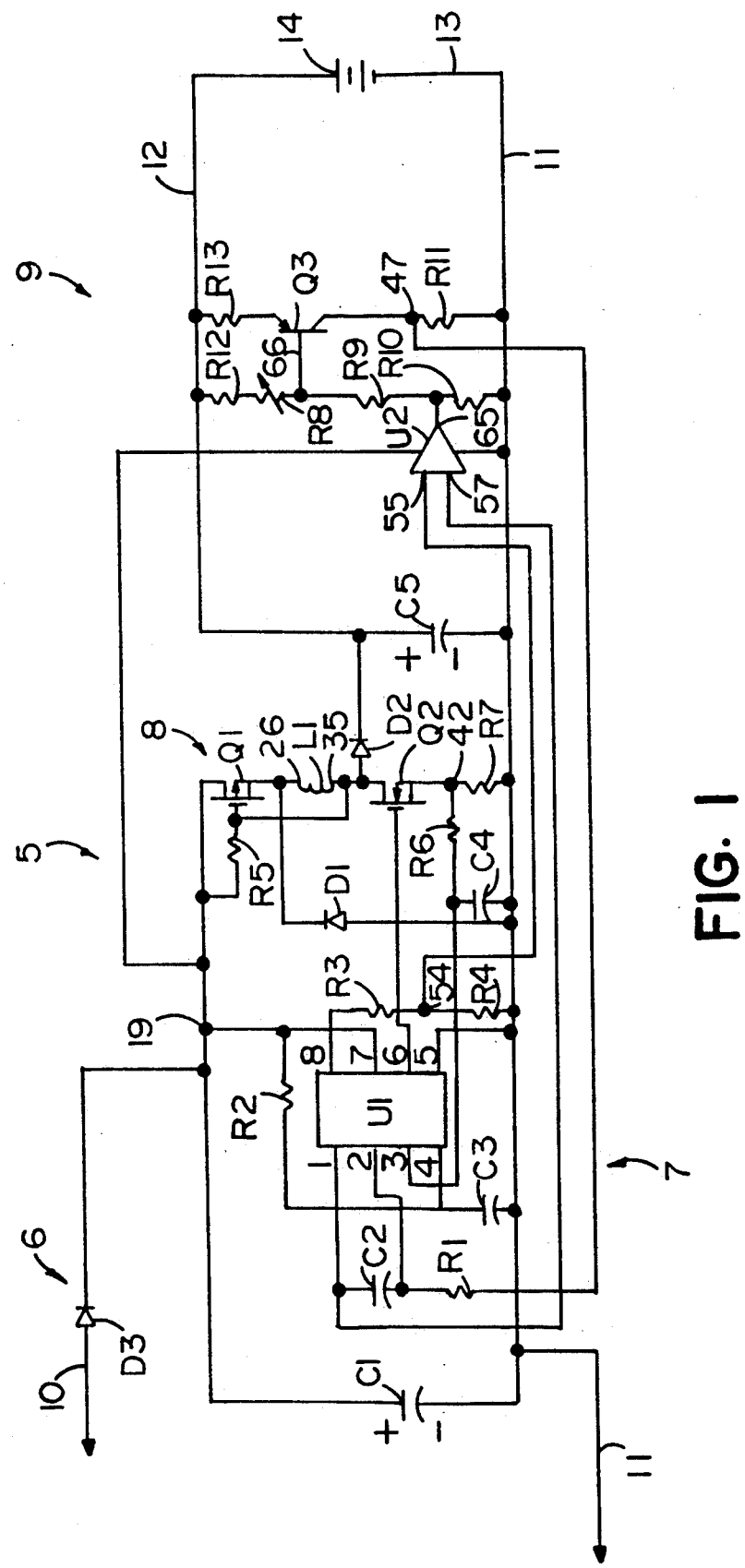

Referring now to the drawing, and the illustrated embodiment depicted therein, a battery charging circuit 5 is illustrated which generally includes an input stage 6, a controller stage 7, a buck-and-boost flyback converter stage 8 and a regulator stage 9. Input stage 6 has a pair of input conductors 10 and 11 which comprise the connection to a battery positive conductor and a battery negative conductor (hereinafter battery ground) of a towing vehicle electrical system, respectively. Regulator stage 9 has a pair of conductors 12 and 13 which comprise the connection to a positive terminal and a negative terminal of the battery to be charged, designated 14.

Input stage 6 of circuit 5 includes a diode D3 and capacitor C1. The anode of diode D3 is connected to the battery positive conductor of a vehicle electrical system through conductor 10. The cathode of diode D3 is connected to the power supply conductor 19 of circuit 5. Diode D3 isolates the towing vehicle electrical system from the charging circuit 5 if the voltage on conductor 19 exceeds the voltage on conductor 10 or if the supply leads should be inadvertently reverse connected at installation. Thus, if conductor 10 is inadvertently connected to the ground terminal of the towing vehicle electrical system, the vehicle ground conductor is isolated from terminal 19 to protect the tow vehicle electrical system and the charger components. Capacitor 16 provides a low-impedance source for circuit 5 and filters noise which would otherwise appear on conductor 19. C1 may be a 470 uF capacitor.

The buck-and-boost flyback converter stage 8 includes a storage element L1 which is a flyback energy storage device for circuit 5. Storage element L1 may be a 0.5 mH inductor. A terminal 26 of storage element L1 is connected to the drain of a MOSFET element Q1. MOSFET element Q1 may comprise a P-channel device, for example a commercially available P-channel device identified as No. BUZ171. Terminal 26 of storage element L1 is also connected to the cathode of a diode D1, the anode of which is connected to battery ground 11. Diode D1 is preferably a Schotky diode and may be a commercially available device identified by No. 1N5819. The source of MOSFET element Q1 is connected to supply conductor 19. The source and gate of MOSFET element Q1 are interconnected by a resistor R5. A terminal 35 of storage element L1 is connected to the drain of a MOSFET element Q2. MOSFET element Q2 may comprise an N-channel device, for example, a commercially available N-channel device identified as No. SMP50N05. Terminal 35 is also connected to the anode of a diode D2, the cathode of which is connected to the positive charging conductor 12. Diode D2 may be a commercially available device identified by No. 1N5819. The source of MOSFET element Q2 is connected to ground conductor 11 through a resistor R7. The gate of MOSFET element Q1 is connected to the drain of MOSFET element Q2. A capacitor C5 is connected between the cathode of diode D2 and ground to filter noise. Capacitor C5 may be a 470 uF capacitor. As will be understood, the basic purpose of MOSFET elements Q1 and Q2 is to selectively connect storage element L1 between supply conductor 19 and battery ground 11 through resistor R7 when the MOSFETS are "on." The basic purpose of diodes D1 and D2 is to selectively connect storage element L1 between ground 11 and positive terminal 12 of battery 14 when MOSFET elements Q1 and Q2 are "off" and the voltage at the anode of diode D1 is larger than that of the battery positive conductor 12.

Controller portion 7 includes an integrated circuit U1 which may be implemented by a switch mode regulator, e.g., the commercially available integrated circuit No. 2843 manufactured by Unitrode. As will be understood, circuit U1 generates a generally constant-frequency variable-pulse-width control signal at pin 6. As utilized in the present application, the non-inverting input (pin 2) of an internal error amplifier in integrated circuit U1 is connected via a resistor R1 to a junction 47 in regulator portion 9 to receive a reference signal from the regulator, as described in greater detail hereinafter. R1 may be a 100 KOhm resistor. The non-inverting input (pin 2) and the output (pin 1) of the internal error amplifier are interconnected through a capacitor C2. Capacitor C2 acts as an integrator to provide filtering and slow the error amplifier's response time to signals at junction 47. C2 may be a 1 uF capacitance. The inverting input (pin 3) of an internal current amplifier of circuit U1 is coupled to the junction 42 of the source of MOSFET element Q2 and resistor R7 via a resistor R6. A capacitor C4 is connected between pin 3 and ground 11. Capacitor C4 removes switching spikes and may be a 0.001 uF capacitor. Resistor R7 provides a reference signal to pin 3 responsive to which integrated circuit U1 controls the duty cycle of the pulsed output signal on pin 6. A capacitor C4 is connected between pin 3 and ground 11. Resistor R6 and capacitor C4 remove noise, such as switching signal spikes generated by the switching of MOSFET elements Q1 and Q2. A capacitor C3 and a resistor R2 are connected in series between power supply terminal 19 and ground terminal 11.

Pin 4 of integrated circuit U1 is connected to the junction of resistor R2 and capacitor C3. Pin 4 is a control input for an internal oscillator which provides a base frequency for pulsed signals on output pin 6 according to the impedance of capacitor C3 and resistor R2. For example, capacitor C3 and resistor R2 may be a 0.2 uF capacitor and a 47 KOhm resistor, respectively, such that the internal oscillator of U1 has a nominal frequency of approximately 20 KHz. The actual frequency of the oscillator will vary slightly from the nominal frequency due to variations in the magnitude of the signal at pin 19, as described in greater detail hereinafter. Power is supplied to integrated circuit U1 via pin 7, and pin 5 thereof is connected to ground conductor 11. Pin 8 of integrated circuit U1 carries a regulated voltage which is five volts above ground conductor 11, and a voltage divider comprising resistors R3 and R4 is connected between pin 8 and ground conductor 11. Resistors R3 and R4 may be 10 KOhm resistors, such that the voltage at a junction 54 of these resistors is approximately 2.5 volts. Junction 54 is connected to the inverting input 55 of a comparator U2 to provide a threshold voltage to comparator U2. A control signal at output pin 1 of U1 is applied to a non-inverting input 57 of comparator U2. Comparator U2 is responsive to the control voltage at input 57 exceeding the threshold voltage at input 55 by changing the impedance of a voltage divider in regulator stage 9, as described in greater detail hereinafter. The pulsed output signal from integrated circuit U1 is provided at pin 6 of the latter, which is coupled to the gate of MOSFET element Q2 for controlling both MOSFET elements Q1 and Q2, as described in greater detail hereinafter.

The regulator portion 9 supplies a regulated voltage to the output conductors 12 and 13 which connect to battery 14 to charge the latter. The regulator 9 includes a voltage divider comprising a resistor R12, a potentiometer R8, a resistor R9, and a resistor R10. The junction of resistors R9 and R10 is connected to the output 65 of comparator U2. R12 may be an 18 KOhm resistor, R8 may be a 5 KOhm potentiometer, R9 may be a 100 KOhm resistor, and R10 may be a 10 KOhm resistor. Thus, the impedance between output conductor 12 and base 66 of a transistor Q3 varies between 18 KOhm and 23 KOhm, depending upon the position of the wiper of potentiometer R8. The impedance between base 66 of transistor Q3 and ground conductor 11 will vary between 110 KOhms and 115 KOhms, depending upon the position of the wiper of potentiometer R8 when input 57 exceeds input 55 of amplifier 42. Potentiometer R8 is used to vary the impedance across the base-emitter path of transistor Q3. The ratio of the impedances on the respective sides of base 66 sets the voltage of regulator portion 9, as described in greater detail hereinafter.

The emitter of transistor Q3 is connected through a resistor R13 to the positive output terminal 12. The collector of transistor Q3 is connected to junction 47, which in turn is connected to ground 11 through a resistor R11. Amplifier U2, according to a preferred embodiment of the invention, is a commercially available integrated circuit identified by No. 2903. The output 65 of comparator U2 is an open collector transistor, such that output 65 is essentially connected to ground conductor 11 when the non-inverting input 57 of comparator U2 is less than the threshold voltage applied to inverting input 55 thereof, to change the regulated voltage. In a preferred embodiment of the invention, resistors R9 and R10 are 1% resistors to provide accurate voltage regulation. The collector-emitter path of transistor Q3 is connected in series with a resistor R13 and a resistor R11. Resistor R13 may have an impedance of 6.8 KOhms and resistor R11 may have an impedance of 10 KOhms. In the preferred embodiment of the invention, resistors R13 and R11 are 1% resistors. Transistor Q3 may be implemented by a commercially available PNP device identified as No. 2N5087.

Somewhat more particularly, the operation of circuit 5 will now be described with reference to the drawing figure. With input 10 connected to the positive terminal of a tow vehicle electrical system positive power supply, the voltage of supply conductor 19 is input to pin 7 of circuit U1, which outputs a pulsed control signal to the base of element Q2. The output signal on pin 6 is essentially switched between pin 7 and pin 5, at a frequency established by the internal oscillator and a duty cycle set by the feedback signal input to pin 3. When pin 6 is connected to pin 7, MOSFET element Q2 is "on," and current will flow through resistor R5 which turns MOSFET element Q1 "on." MOSFET elements Q1 and Q2 thus connect element L1 between supply conductor 19 and ground 11, with diode D1 reverse-biased to isolate terminal 26 of storage element L1 from ground conductor 11. Storage element L1 will thus charge from supply conductor 19. The control signal at pin 6 of circuit U1 holds MOSFET elements Q1 and Q2 "on" until the current through storage element L1 reaches a predetermined level (e.g., 1 amp), which condition is identified by the voltage across 1 Ohm resistor R7 reaching 1 volt. When the internal current sense comparator of U1 detects the 1 volt signal at pin 3, pin 6 is effectively connected to ground terminal 11, via pin 5. MOSFET element Q2 will accordingly turn "off" and remove the voltage across resistor R5. When the voltage drop across resistor R5 is removed, MOSFET element Q1 turns off. The energy stored in inductor L1 is then discharged into battery 14 since storage element L1 is connected between battery ground 11 and conductor 12, via diodes D1 and D2. Since both sides of inductor L1 are switched, energy storage element L1 will charge each time the MOSFET elements Q1 and Q2 are "on" and discharge through diode D2 each time the MOSFET elements turn "off." Stage 8 thus provides a current injection to regulator stage 9, regardless of whether the source potential at 19 or battery potential at terminal 12 is greater. Stage 8 thus functions as both a buck-and-boost flyback converter stage.

The input on pin 2 of circuit U1 is the inverting input to the internal error amplifier thereof, as indicated above, and the output voltage on pin 1 is applied to the non-inverting input of amplifier U2. When the potential of the battery to be charged (i.e., 14) is small, the voltage on resistor R4 will reach one volt during each cycle of the internal oscillator in U1. Consequently, the inductive element L1 will act as a current source. As the battery 14 reaches a desired final voltage, resistors R8, R9, R10, and R12 apply a voltage to the base 66 of transistor Q3, causing a larger current to flow through resistor R13. When the base voltage of transistor Q3 is such that this transistor generates a current across resistor R11 which is approximately 2.5 volts, the error amplifier in integrated circuit U1 operates to reduce the voltage at pin 1. When the output voltage at pin 1 is reduced, U1 will short resistor R10 by connecting output 65 to ground 11 through the internal output stage transistor of amplifier U2. The impedance between the base of transistor Q3 and ground 11 will thus be reduced by the resistance of R10. For example, the four element voltage divider R8, R9, R10 and R12 may be set via potentiometer R8 to provide an error voltage feedback of 2.5 volts when the voltage across output terminals 12 and 13 is approximately 14.8 or 14.9 volts. When resistor R10 is shorted, the voltage across the battery positive terminal 12 and the base of transistor Q3 remains the same, such that the voltage across the output is limited to approximately 13.7 volts.

Still more particularly, regulator portion 9, according to the preferred embodiment of the invention, generates an output voltage which is approximately 6 times the voltage drop from battery positive conductor 12 to base 66 of transistor Q3 due to the ratio of the impedances in the above-described voltage divider. The voltage drop across base 66 is set by the current through resistor R13 and the voltage drop across the base-emitter path of transistor Q3. When the voltage across resistor R11 reaches 2.5 volts, the signal at output pin 2 of integrated circuit U1 will drop below 2.5 volts. Accordingly, amplifier U2 shorts out resistor R10. Because a 250 microamp current is flowing through resistor R11 when it reaches 2.5 volts, a 250 microamp current is also flowing through resistor R13. The 250 microamp current generates a 1.7 volt drop across 6.8 KOhm resistor R13. The base-emitter voltage drop of Q3 will be 0.6 volts at 22° C. The total drop between base 66 and resistor R13 is thus 2.3 volts when the threshold of 2.5 volts is reached at 22° C. The voltage across resistor R12 and potentiometer R8 will also be 2.3 volts. With the impedance of potentiometer R8 set at 2 KOhms, the total voltage across output terminals 12 and 13 is 14.9 volts when the voltage on resistor R11 reaches 2.5 volts. When resistor R10 is shorted, this potential across output terminals 12 and 13 drops to 13.8 volts. This voltage across base 66 and conductor 12 is dependent upon the emitter-base voltage drop, which is temperature-dependent. The base-emitter voltage drops approximately 2 millivolts for each degree C. that the ambient temperature changes. Because the voltage across output terminals 12 and 13 is related to the base-emitter voltage, the output voltage of regulator portion 9 will drop 12 millivolts (2 millivolts base-emitter times 6) for each degree C. that the temperature increases, and increases by 12 millivolts for each degree C. that the temperature decreases. In one preferred embodiment of the invention, battery 14 is a 4 ampere-hour sealed lead-acid battery having an optimal charging voltage of 14.7 volts at 22° C. with an optimum 13.9 volt "floating potential." These optimum voltages increase by 12 millivolts for each degree C. decrease in temperature, and decrease by approximately 12 millivolts for each degree C. increase in temperature. Thus, the base-emitter voltage changes generate a temperature-dependent signal which compensates for ambient temperature variations by changing the voltage across conductors 12 and 13 proportionally thereto.

Those skilled in the art will recognize that because resistor R2 and capacitor C3 are connected to conductor 19, and the duty cycle of the oscillator is proportional to the signal at pin 4, the base frequency of the internal oscillator will vary with the magnitude of the signal on conductor 10. Thus, for larger potentials on conductor 19, the output signal will have a higher frequency, such that inductor L1 will charge and discharge more frequently and thereby generate a larger effective charging potential. This allows the battery to charge more rapidly.

It is to be understood that the foregoing description of the preferred embodiment of the invention is provided for purposes of description and illustration and not as a measure of the invention, whose scope is to be defined by reference to the ensuing claims. Thus, those skilled in the art may devise embodiments of the particular concepts presented in the foregoing illustrated disclosure which differ from the particular embodiments shown and described in detail herein or may make various changes in structural details to the illustrated embodiment; for example, amplifier 50 may be replaced with an amplifier and a MOSFET transistor. Accordingly, all such alternative or modified embodiments utilizing the underlying concepts of the invention and incorporating the spirit thereof are to be considered as within the scope of the claims appended hereinbelow unless such claims, by their language, specifically state otherwise.

The embodiments of the invention in which an exclusive property of privilege is claimed are defined as follows.

1. In a battery charger for charging a battery from a vehicle electrical system, the improvement comprising: a regulator having input means for coupling to the vehicle electrical system to receive power therefrom and an output for coupling to the battery, said input means including a first input for coupling to the vehicle electrical system and a second input for receiving an input signal, said regulator including means coupled to said input means for controlling a voltage at said output responsive to a control signal such that said voltage has a first regulated value for charging said battery to a first level and a second regulated value for maintaining said battery at a second level after said battery has reached said first level, said regulator further including a voltage divider and a control device, said voltage divider including a plurality of impedance elements, one of said impedance elements connected in parallel with said control device, said control device being responsive to said input signal for selectively, substantially shorting said one of said impedance elements of said voltage divider.

2. The improvement in a battery charger as defined in claim 1, wherein said control device includes an amplifier, said amplifier having a first input receiving said input signal and a second input receiving a threshold signal.

3. The improvement in a battery charger as defined in claim 2, wherein said amplifier includes an output connected to one terminal of said one of said impedance elements.

4. A battery charger for charging a battery from a towing vehicle electrical circuit, comprising:
a voltage converter including an energy storage element and a switch, said switch for selectively coupling said storage element to the towing vehicle electrical system and said energy storage element selectively outputting a supply signal;
a controller including a first input for coupling to said towing vehicle electrical system, a second input coupled to said storage element and at least one output coupled to said switch, said controller generating a control signal applied to said output for controlling said switch responsive to a reference signal received at said second input and a signal received from said first input; and a regulator coupled to said energy storage element and said battery for regulating the voltage applied to said battery.

5. The battery charger as defined in claim 4, wherein said controller includes means for generating control pulses applied to said output for controlling said switch.

6. The battery charger as defined in claim 5, wherein said means for generating control pulses includes an oscillator signal having a frequency proportional to the magnitude of the signal at said first input.

7. A battery charger for charging a battery from a vehicle electrical system, comprising:

input means for coupling to the vehicle electrical system for receiving power from the vehicle electrical system, said input means generating an output signal on an output conductor thereof, said output conductor for coupling to said battery; and a regulator coupled to said output conductor of said input means, said regulator for controlling said output signal, said regulator including means for generating a signal dependent upon an ambient temperature, and means responsive to said temperature-dependent signal for controlling said output signal applied to said battery such that the level of said output signal applied to said battery varies in predetermined relation to said ambient temperature.

8. The battery charger as defined in claim 7, wherein said input means includes an energy storage device for coupling to said vehicle electrical system.

9. The battery charger as defined in claim 8, wherein said input means further includes switch means for selectively connecting said energy storage means to said vehicle electrical system and to said battery.

10. The battery charger as defined in claim 7, wherein said temperature-dependent signal-generating means includes a transistor.

11. The battery charger as defined in claim 10, further including a voltage divider connected across said battery wherein a base of said transistor is connected to said voltage divider.

12. The battery charger as defined in claim 11, wherein said transistor is connected so as to supply current to a resistor, said resistor providing a reference to a controller.

* * * * *